United States Patent
Kobayashi et al.

(10) Patent No.: US 9,290,173 B2
(45) Date of Patent: Mar. 22, 2016

(54) ENGINE START CONTROL DEVICE FOR HYBRID VEHICLE

(75) Inventors: Nobufusa Kobayashi, Anjo (JP); Toshio Sugimura, Nagoya (JP); Masato Yoshikawa, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/373,201

(22) PCT Filed: Jan. 20, 2012

(86) PCT No.: PCT/JP2012/051246
§ 371 (c)(1),
(2), (4) Date: Jul. 18, 2014

(87) PCT Pub. No.: WO2013/108401
PCT Pub. Date: Jul. 25, 2013

(65) Prior Publication Data
US 2015/0203103 A1 Jul. 23, 2015

(51) Int. Cl.
*B60W 10/08* (2006.01)
*B60W 20/00* (2006.01)
*B60W 40/00* (2006.01)
*B60K 6/48* (2007.10)
*B60W 10/06* (2006.01)
*B60W 10/02* (2006.01)

(52) U.S. Cl.
CPC .............. *B60W 20/40* (2013.01); *B60K 6/48* (2013.01); *B60W 10/02* (2013.01); *B60W 10/06* (2013.01); *B60W 10/08* (2013.01); *B60W 2710/083* (2013.01); *Y02T 10/6221* (2013.01); *Y02T 10/6286* (2013.01); *Y10S 903/93* (2013.01); *Y10T 477/23* (2015.01)

(58) Field of Classification Search
CPC ...... B60W 10/08; B60W 20/00; B60W 40/00
See application file for complete search history.

(56) References Cited

U.S. PATENT DOCUMENTS

| 8,775,004 B2* | 7/2014 | Suzuki | 701/22 |
| 2005/0049771 A1* | 3/2005 | Kuang et al. | 701/51 |
| 2006/0079377 A1* | 4/2006 | Steen et al. | 477/186 |
| 2007/0227791 A1* | 10/2007 | Ueno | 180/65.2 |
| 2010/0009805 A1* | 1/2010 | Bachmann | 477/5 |
| 2015/0080175 A1* | 3/2015 | Kobayashi et al. | 477/5 |

FOREIGN PATENT DOCUMENTS

| CN | 101045453 A | 10/2007 |
| JP | 06-017727 A | 1/1994 |
| JP | 2010-120518 A | 6/2010 |

* cited by examiner

*Primary Examiner* — Tisha Lewis
(74) *Attorney, Agent, or Firm* — Kenyon & Kenyon LLP

(57) ABSTRACT

In the present invention, a determination is made as to whether towing travel is under way, in which vehicle weight is increased, and when towing travel is under way, the compensating torque provided by a motor generator is decreased relative to the compensating torque provided during non-towing travel, and the torque of the motor generator is therefore reduced by a commensurate amount and fuel efficiency is enhanced. During towing travel in which the vehicle weight is large, a large drive force is usually necessary and the frequency of use of the motor generator increases; however, the compensating torque during engine start is reduced, and the load on the motor generator is thereby mitigated by a commensurate amount, and overheating and the like are suppressed. Since the inertia of the vehicle is relatively small during non-towing travel, i.e., normal travel, in which the vehicle weight is relatively small, variations in the drive force due to the engine starting torque are relatively increased, and shocks such as a sense of being pulled back become significant. However, because the compensating torque provided by the motor generator is increased correspondingly with the starting torque, shocks are adequately suppressed.

3 Claims, 3 Drawing Sheets

| RUNNING MODE | ENGINE | MG | K0 CLUTCH | L/U CLUTCH |
|---|---|---|---|---|
| ENGINE RUNNING | OPERATED | FREE/ POWER RUNNING | ENGAGED | ENGAGED/RELEASED |
| MOTOR RUNNING | STOPPED | POWER RUNNING | RELEASED | ENGAGED |

ENGINE START CONTROL DEVICE FOR HYBRID VEHICLE

CROSS-REFERENCE TO RELATED APPLICATIONS

This is a national phase application based on the PCT International Patent Application No. PCT/JP2012/051246 filed Jan. 20, 2012, the entire contents of which are incorporated herein by reference.

TECHNICAL FIELD

The present invention relates to an engine start control device of a hybrid vehicle and particularly to an improvement in technique of suppressing drive force variation by increasing a torque of an electric motor at the time of cranking and starting an engine.

BACKGROUND ART

In a hybrid vehicle including (a) an electric motor and (b) an engine connected to a drive force transmission path via a connecting/disconnecting device connecting/disconnecting power transmission, (c) when the connecting/disconnecting device is connected to crank and start the engine during running with the electric motor, a torque of the electric motor is increased to compensate a start torque of the engine with the electric motor so as to suppress drive force variation in a proposed technique (see Patent Document 1).

PRIOR ART DOCUMENT

Patent Document

Patent Document 1: Japanese Laid-Open Patent Publication No. 6-17727

SUMMARY OF THE INVENTION

Problem to be Solved by the Invention

However, when the engine is started, if the start torque thereof is compensated with the electric motor, the torque of the electric motor is accordingly made larger, deteriorating fuel efficiency. On the other hand, if the start torque of the engine is not compensated with the electric motor, a drive force is varied by the start torque, generating a shock such as a pull-in feeling.

The present invention was conceived in view of the situations and it is therefore an object of the present invention to improve fuel efficiency while suppressing a shock (drive force variation) due to a start torque when an engine is cranked and started during running.

Means for Solving the Problem

To achieve the object, the present invention provides an engine start control device of a hybrid vehicle including (a) an electric motor, and (b) an engine connected to a drive force transmission path via a connecting/disconnecting device connecting/disconnecting power transmission, (c) the engine start control device connecting the connecting/disconnecting device to crank the engine during running with the electric motor and increasing a torque of the electric motor at the time of cranking of the engine, wherein (d) when a vehicle weight is determined, if the vehicle weight is larger, a torque increase amount of the electric motor increased at the time of cranking of the engine is made smaller as compared to when the vehicle weight is smaller.

The second aspect of the invention provides the engine start control device of a hybrid vehicle recited in the first aspect of the invention, wherein (a) running only with the electric motor and running using the engine are switched based on a driver's request drive force, and wherein (b) when the vehicle weight is larger, a range of the request drive force for the running only with the electric motor is made larger as compared to when the vehicle weight is smaller.

The third aspect of the invention provides the engine start control device of a hybrid vehicle recited in the first or second aspect of the invention, wherein the case of the larger vehicle weight corresponds to the time of towing running.

Effects of the Invention

In the engine start control device of a hybrid vehicle as described above, if the vehicle weight is larger, a torque increase amount of the electric motor at the time of cranking of the engine is made smaller as compared to when the vehicle weight is smaller, and therefore, the torque of the electric motor is accordingly reduced to improve fuel efficiency. If the vehicle weight is larger, larger inertia of the vehicle makes drive force variation due to the start torque relatively smaller and reduces a shock due to the drive force variation and, therefore, making the torque increase amount of the electric motor smaller causes no risk of considerably deteriorating the shock. Although a larger drive force is generally required and the electric motor is more frequently used if the vehicle weight is larger, since the torque increase amount of the electric motor at the time of engine start is reduced, the load of the electric motor is accordingly reduced to suppress overheating etc.

On the other hand, if the vehicle weight is smaller, relatively smaller inertia of the vehicle makes the drive force variation due to the engine start torque relatively larger and a shock such as a pull-in feeling becomes larger; however, since the torque increase amount of the electric motor is relatively large, the shock is properly suppressed. As described above, since the torque increase amount of the electric motor at the time of engine start is changed depending on the vehicle weight, fuel efficiency can be improved while the shock due to the start torque is properly suppressed, and the load of the electric motor is reduced to suppress overheating etc.

In the second aspect of the invention, since when the vehicle weight is larger, a range of the request drive force for running only with the electric motor is made larger as compared to when the vehicle weight is smaller, and the frequency of running only with the electric motor is accordingly increased, fuel efficiency can further be improved. This is a technique that can be realized because the torque increase amount of the electric motor is made smaller at the time of cranking of the engine when the vehicle weight is larger to decrease the load of the electric motor.

In a third aspect of the invention, since it is determined that vehicle weight is larger during towing running and a torque increase amount of the electric motor is made smaller at the time of engine start, fuel efficiency can be improved while a shock at the time of engine start is properly suppressed during the towing running, and the load of the electric motor is reduced to suppress overheating etc.

MODE FOR CARRYING OUT THE INVENTION

Figure 1:
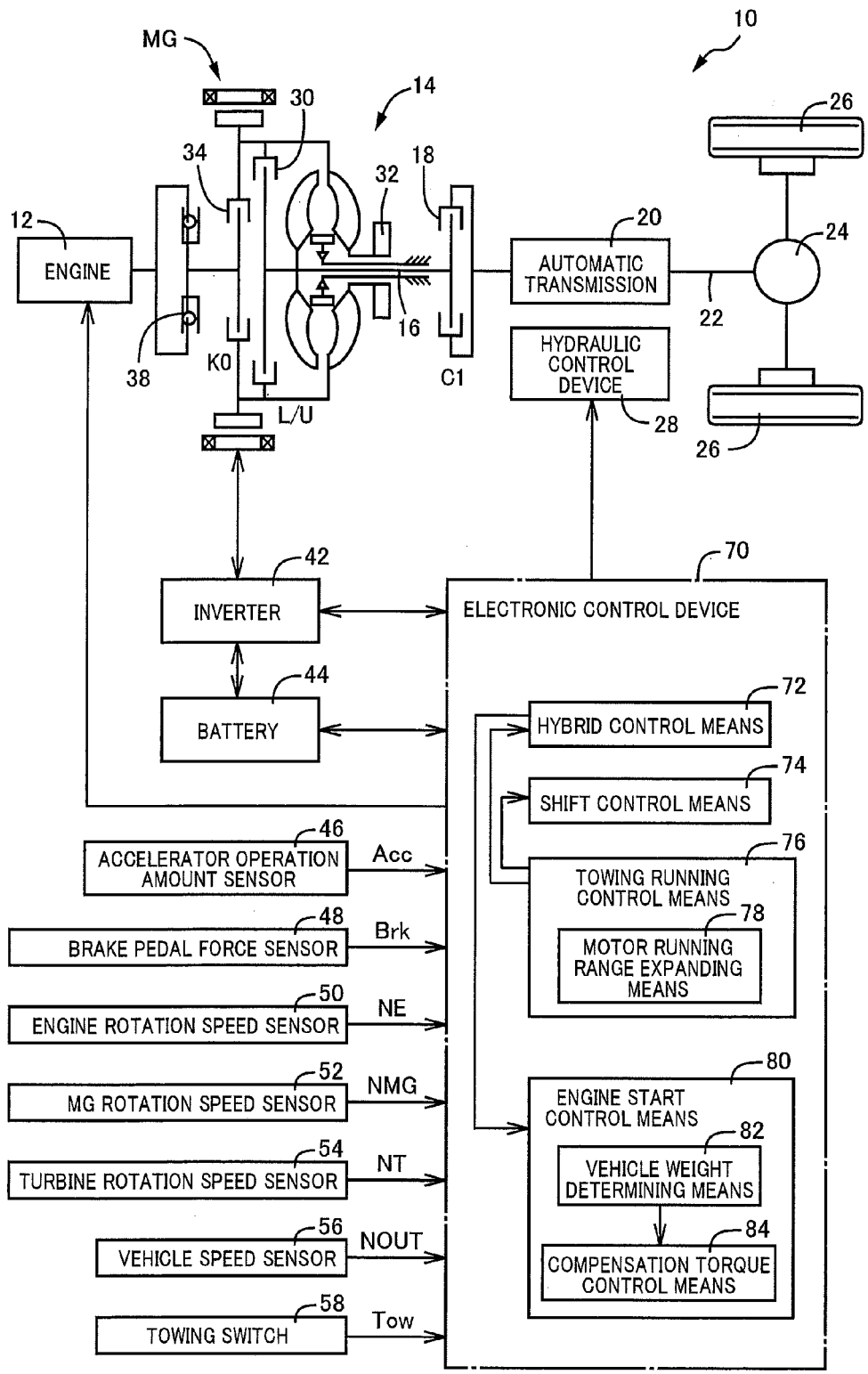
FIG. 1 is a diagram of a general configuration indicating a schematic of a hybrid vehicle to which the present invention is preferably applied along with a main portion of a control system.

Although the present invention is preferably applied to a hybrid vehicle having an engine and an electric motor connected via a connecting/disconnecting device, the present invention is applicable to various hybrid vehicles of a parallel type, a series type, etc. The engine is an internal combustion engine combusting fuel to generate power. Although the electric motor is preferably a motor generator also usable as an electric generator, the electric motor may not have a function of an electric generator. Although the connecting/disconnecting device connecting the engine to a drive force transmission path is preferably a clutch of a friction engagement type, the connecting/disconnecting device may be, for example, a device connecting the engine to the drive force transmission path and an electric generator via a dividing mechanism such as a planetary gear device to connect/disconnect power transmission between the engine and the drive force transmission path through torque control of the electric generator, and can take various forms capable of cranking the engine by utilizing inertial energy of a vehicle. The engine and the electric motor may not necessarily be disposed on the same drive force transmission path and, for example, the engine can be disposed on a drive force transmission path on the front wheel side with the electric motor disposed on a drive force transmission path on the rear wheel side.

The hybrid vehicle of the present invention is configured to have a plurality of running modes such as engine running for running by using at least the engine as a drive force source and motor running for running by using only the electric motor as a drive force source with the engine stopped, for example, and can use the electric motor in an assistive manner or on a constant basis during the engine running. The engine running and the motor running are switched in accordance with a switching map defined by using operation states such as a vehicle speed and an accelerator operation amount (request drive force) as parameters such that the motor running is performed in a low-load operation range while the engine running is performed in a high-load operation range, for example, and the present invention is applied when the engine is started for switching from the motor running to the engine running. The present invention may also be applied when the engine is started for the purpose other than the engine running such as when the engine is started to allow the electric generator to charge a battery if a storage remaining amount SOC of the battery becomes lower.

The switching map can be changed depending on whether a vehicle weight is larger as in the case of the second aspect of the invention and, if the vehicle weight is larger, a motor running range is expanded toward a higher accelerator operation amount and a higher vehicle speed, for example; however, at the time of implementation of the first aspect of the invention, the motor running range may be constant regardless of a level of the vehicle weight or, conversely, the motor running range can be narrowed toward a lower accelerator operation amount and a lower vehicle speed or the motor running range can be eliminated. At the time of implementation of the second aspect of the invention, although the switching map may simply be switched in two stages depending on whether the vehicle weight is larger, the switching map may be changed stepwise or continuously depending on the vehicle weight.

A torque increase amount (compensation torque) of the electric motor at the time of cranking and starting the engine is appropriately determined depending on a start torque of the engine, i.e., a transmission torque of the connecting/disconnecting device. Although this torque increase amount is desirably at a level capable of completely cancelling the drive force variation due to the start torque of the engine, the torque increase amount may at least reduce the drive force variation due to the start torque. Although the torque increase amount is made smaller when the vehicle weight is larger as compared to when the vehicle weight is smaller, this torque increase amount may be a constant value such as about 50% of the amount in the case of a smaller vehicle weight, for example, or may be reduced stepwise or continuously depending on the vehicle weight. If the vehicle weight is larger, the torque increase amount may be zero.

The present invention is configured to have, for example, a vehicle weight determining means determining whether the vehicle weight is larger in accordance with a predefined determination criterion and a torque increase amount control means (such as a compensation torque control means) reducing the torque increase amount from the electric motor when it is determined that the vehicle weight is larger, as compared to the other cases. For example, in a hybrid vehicle capable of towing miming i.e., running for towing a towed vehicle, the vehicle weight determining means is configured to be capable of determining that the vehicle weight is larger during the towing miming and to determine whether the towing running is being performed from ON/OFF signals of a towing switch or drive force performance (such as vehicle acceleration relative to an accelerator operation amount) of the vehicle. Even in a hybrid vehicle without the towing miming, the vehicle weight can be determined from the drive force performance of the vehicle or the vehicle weight can be determined by detecting a presence/absence or loading weight of loaded cargo such as a container, or the number of passengers of a bus etc.

EXAMPLE

An example of the present invention will now be described in detail with reference to the drawings.

FIG. 1 is a diagram of a general configuration including a schematic of a drive system of a hybrid vehicle 10 to which the present invention is preferably applied. The hybrid vehicle 10 includes an engine 12 that is an internal combustion engine such as a gasoline engine and a diesel engine combusting fuel to generate power, and a motor generator MG acting as an electric motor and an electric generator, as drive force sources. Output of the engine 12 and the motor generator MG is transmitted from a torque converter 14 that is a fluid power transmission device via a turbine shaft 16 and a C1 clutch 18 to an automatic transmission 20 and further transmitted via an output shaft 22 and a differential gear device 24 to left and right drive wheels 26. The torque converter 14 includes a lockup clutch (L/U clutch) 30 directly coupling a pump impeller to a turbine impeller, and the pump impeller is integrally connected to a mechanical oil pump 32 and is mechanically rotationally driven by the engine 12 and the motor generator MG to generate and supply oil pressure to a hydraulic control device 28. The lockup clutch 30 is engaged or released by an electromagnetic hydraulic control valve, a switching valve, etc. disposed in the hydraulic control device 28. The motor generator MG corresponds to an electric motor.

A K0 clutch 34 is disposed between, and directly couples, the engine 12 and the motor generator MG via a damper 38. The K0 clutch 34 is a single-plate or multi-plate hydraulic friction engagement device frictionally engaged by an oil pressure and acts as a connecting/disconnecting device connecting and disconnecting the engine 12 to/from the motor generator MG, i.e., a drive force transmission path. The motor generator MG is connected via an inverter 42 to a battery 44. The automatic transmission 20 is a stepped automatic transmission of a planetary gear type etc., having a plurality of gear stages with different gear ratios established depending on engaged/released states of a plurality of hydraulic friction engagement devices (clutches and brakes) and is subjected to shift control by electromagnetic hydraulic control valves, switching valves, etc. disposed in the hydraulic control device 28. The C1 clutch 18 acts as an input clutch of the automatic transmission 20 and is also subjected to engagement/release control by the hydraulic control device 28.

The hybrid vehicle 10 configured as described above includes an electronic control device 70. The electronic control device 70 includes a so-called microcomputer having a CPU, a ROM, a RAM, an I/O interface, etc., to execute signal processes in accordance with a program stored in advance in the ROM, while utilizing a temporary storage function of the RAM. The electronic control device 70 is supplied with a signal indicative of an operation amount (accelerator operation amount) Acc of an accelerator pedal from an accelerator operation amount sensor 46 and is supplied with a signal indicative of a brake pedal tread force (brake pedal force) Brk from a brake pedal force sensor 48. The electronic control device 70 is also supplied with signals indicative of a rotation speed (engine rotation speed) NE of the engine 12, a rotation speed (MG rotation speed) NMG of the motor generator MG; a rotation speed (turbine rotation speed) NT of the turbine shaft 16, and a rotation speed (output shaft rotation speed corresponding to a vehicle speed V) NOUT of the output shaft 22, from an engine rotation speed sensor 50, an MG rotation speed sensor 52, a turbine rotation speed sensor 54, and a vehicle speed sensor 56, respectively. Various pieces of information necessary for various controls are also supplied.

The electronic control device 70 is also connected to a towing switch 58. The towing switch 58 is a switch used when a driver selects a towing running mode of running for towing a towed vehicle, and supplies a towing selection signal Tow meaning that the towing running mode is selected. A towing detection switch detecting a presence/absence of a towed vehicle may be provided instead of or in addition to the towing switch 58 to determine the towing running mode from either or both of the signals. The towing running mode can also be determined when actual vehicle acceleration is smaller by a predetermined value or more relative to reference acceleration defined in advance by using as parameters the accelerator operation amount Acc, a throttle valve opening degree, etc. during non-towing running without a towed vehicle, for example.

Figures 2, 3:
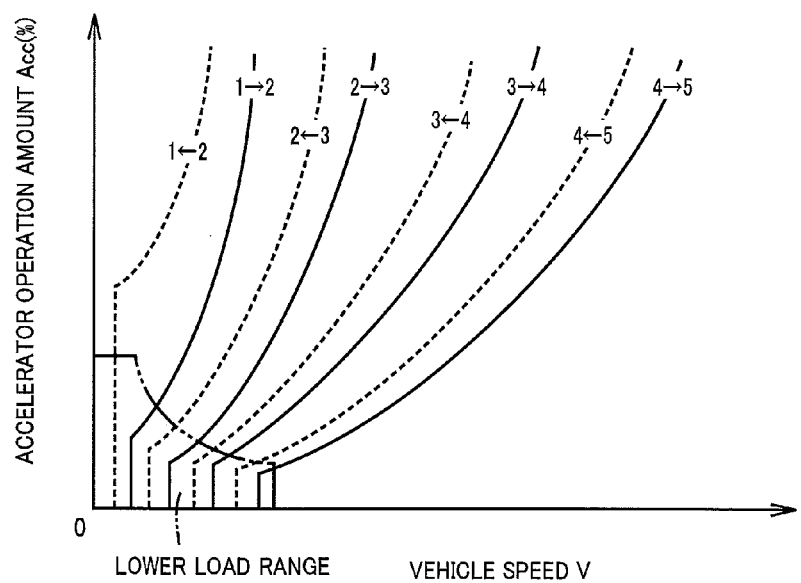
FIG. 2 is a diagram for explaining an engine running mode and a motor running mode of the hybrid vehicle of FIG. 1.
FIG. 3 relates to an automatic transmission of the hybrid vehicle of FIG. 1 and is a diagram for explaining an example of a shift map for automatically switching a plurality of gear stages depending on operation states.

The electronic control device 70 functionally includes a hybrid control means 72, a shift control means 74, a towing running control means 76, and an engine start control means 80. The hybrid control means 72 controls operations of the engine 12 and the motor generator MG to switch a plurality of running modes such as an engine running mode using the engine 12 as a power source for running and a motor running mode using only the motor generator MG as a power source for running depending on an operation state such as the accelerator operation amount Acc and the vehicle speed V for running. For example, the vehicle runs in the motor running mode in a lower load range (e.g., a range indicated by a dashed-two dotted line of FIG. 3) associated with a lower accelerator operation amount Acc and a lower vehicle speed and, when the lower load range is exceeded, the vehicle runs in the engine running mode. The dashed-two dotted line of FIG. 3 is an example of a switching map for switching the running modes depending on an operation state and the lower load range is a motor running range while a range exceeding the lower load range is an engine running range. The accelerator operation amount Acc corresponds to a driver's request drive force.

FIG. 2 is a diagram for explaining operating states of the portions in the engine running mode and the motor running mode and, in the engine running mode, the K0 clutch 34 is engaged to connect the engine 12 to the drive force transmission path while the lockup clutch 30 is engaged or released in accordance with a switching map defined in advance by using the operation states such as the accelerator operation amount Acc and the vehicle speed V as parameters. The motor generator MG is basically in a free (free rotation) state with motor torque=0 and is subjected to power running control as needed to assist drive force. In the motor running mode, the K0 clutch 34 is released to disconnect the engine 12 from the power transmission path while the lockup clutch 30 is maintained in an engaged state. At the time of vehicle stop, the motor generator MG is operated at a predetermined rotation speed to generate a predetermined creep torque via the torque converter 14 while a predetermined oil pressure is output from the mechanical oil pump 32 to maintain a predetermined hydraulic friction engagement device of the automatic transmission 20 etc. in an engaged state.

The shift control means 74 controls the electromagnetic hydraulic control valve, the switching valve, etc. disposed in the hydraulic control device 28 to switch the engaged/released states of the plurality of hydraulic friction engagement devices (clutches and brakes) of the automatic transmission 20, thereby switching a plurality of gear stages of the automatic transmission 20 in accordance with a shift map (switching condition) defined in advance by using the operation states such as the accelerator operation amount Acc and the vehicle speed V as parameters. FIG. 3 depicts an example of a shift map stored in advance by using the vehicle speed V and the accelerator operation amount Acc as parameters in the case of five forward speeds from a first speed gear stage "1" to a fifth speed gear stage "5", and the shift map is defined such that a gear stage on a lower speed side with a larger gear ratio is established as the vehicle speed V becomes lower or the accelerator operation amount Acc becomes larger. Solid lines and broken lines of FIG. 3 are upshift lines and downshift lines, respectively, and are disposed with predetermined hysteresis. The shift control means 74 also switches the gear stages in accordance with a shift request from a driver's manual operation if a manual shift mode is selected.

Figure 4:
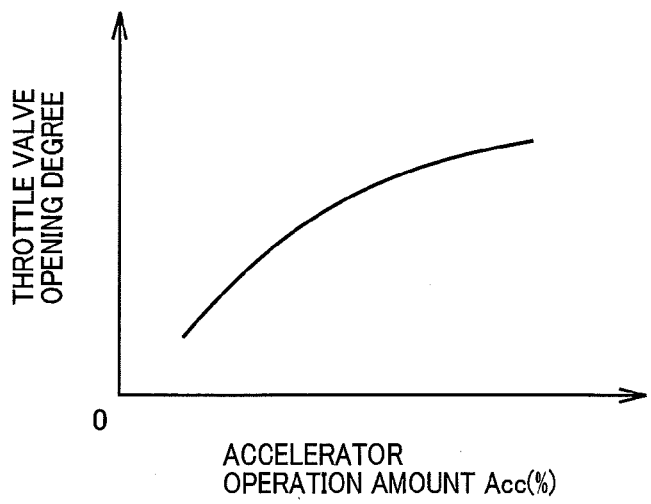
FIG. 4 relates to engine control of the hybrid vehicle of FIG. 1 and is a diagram for explaining an example of a control characteristic of a throttle valve opening degree relative to an accelerator operation amount.

The towing running control means 76 relates to the towing running mode when the towing running mode is selected by the towing switch 58, and makes an upshift difficult and a downshift easy by, for example, changing the shift lines of the shift map of FIG. 3 toward a higher vehicle speed as compared to a normal state depicted in FIG. 3 on uphill/downhill roads, etc., so as to more frequently use a gear stage on the lower speed side at which a larger drive force is promptly acquired. A control characteristic of the throttle valve opening degree depicted in FIG. 4 is changed toward a higher throttle valve opening degree as compared to a normal state depicted in FIG. 4 so as to acquire larger output from the same accelerator operation amount Acc.

The towing running control means 76 also functionally includes a motor running range expanding means 78 to expand the lower load range of FIG. 3 for selecting the motor running mode toward a higher vehicle speed and a higher accelerator operation amount as compared to a normal state indicated by the dashed-two dotted line. As a result, even in the towing running mode, a frequency of running in the motor running mode is increased during running with a relatively lower load, which contributes to an improvement in fuel efficiency.

For example, if the hybrid control means 72 outputs an engine start command to switch the motor running mode to the engine running mode, the engine start control means 80 engages the K0 clutch 34 to crank the engine 12 and provides start control such as fuel injection and ignition to start the engine 12. The engine start control means 80 functionally includes a vehicle weight determining means 82 and a compensation torque control means 84 and executes a signal process in accordance with a flowchart of FIG. 5 to compensate a start torque (load) at the time of cranking of the engine 12 in accordance with vehicle weight with the motor generator MG. Step S2 of FIG. 5 corresponds to the vehicle weight determining means 82 and steps S3 and S4 correspond to the compensation torque control means 84.

Figure 5:
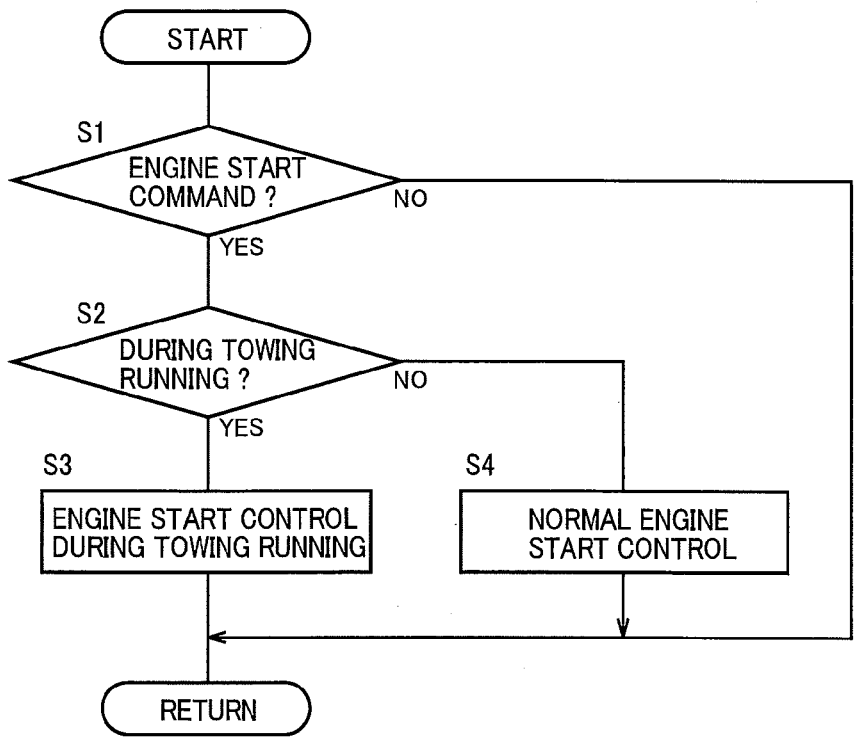
FIG. 5 is a flowchart for explaining an operation of an engine start control means functionally included in an electronic control device of FIG. 1.

The flowchart of FIG. 5 is executed, for example, during running in the motor running mode and, at step S1, it is determined whether an engine start command is output from the hybrid control means 72. If the engine start command is not output, the process is directly terminated, or if the engine start command is output, step S2 is executed. At step S2, it is determined whether the towing running is being performed with the towing running control means 76, i.e., whether the towing running mode is selected by the towing switch 58. In this example, it is determined that vehicle weight is increased if the towing running is being performed.

If the determination at step S2 is YES (affirmative), i.e., if it is determined that the towing running is being performed with increased vehicle weight, step S3 is executed. At step S3, engine start control during the towing running is provided by engaging the K0 clutch 34 to crank the engine 12 and providing the start control such as fuel injection and ignition to start the engine 12 while torque of the motor generator MG is increased by a compensation torque smaller than normal so as to suppress a shock due to engine start torque. In particular, during the towing running with larger vehicle weight, larger inertia of the vehicle makes drive force variation due to the start torque relatively smaller and reduces a shock due to the drive force variation and, therefore, making the compensation torque from the motor generator MG smaller causes no risk of considerably deteriorating the shock. Although a larger drive force is generally required and the motor generator MG is more frequently used during the towing running with larger vehicle weight, since the compensation torque at the time of engine start is reduced, load of the motor generator MG is accordingly reduced to suppress overheating etc. As a result, the vehicle can run in the motor running mode even during the towing running and fuel efficiency can be improved. The compensation torque in this case is set to a constant value such as about 50% or less of normal compensation torque during non-towing running, for example. The compensation torque is a torque increase amount of the motor generator MG increased for suppressing the drive force variation at the time of cranking of the engine 12.

On the other hand, if the determination at step S2 is NO (negative), i.e., during normal running with relatively smaller vehicle weight rather than during the towing running, step S4 is executed. At step S4, the normal engine start control is provided by engaging the K0 clutch 34 to crank the engine 12 and providing the start control such as fuel injection and ignition to start the engine 12 while the torque of the motor generator MG is increased by a compensation torque corresponding to the start torque so as to suppress a shock due to the engine start torque. In particular, during the non-towing running with relatively smaller vehicle weight, smaller inertia of the vehicle makes the drive force variation due to the start torque relatively larger and increases the shock due to the drive force variation and, therefore, the compensation torque from the motor generator MG is set to a relatively larger value corresponding to the start torque to properly suppress the shock due to the start torque with the compensation torque from the motor generator MG.

As described above, in the engine start control means 80 of the hybrid vehicle 10 of this example, it is determined whether the towing running is being performed with increased vehicle weight and, if the towing running is being performed, the compensation torque from the motor generator MG is made smaller as compared to the non-towing running and, therefore, the torque of the motor generator MG is accordingly reduced to improve fuel efficiency. Although a larger drive force is generally required and the motor generator MG is more frequently used during the towing running with larger vehicle weight, since the compensation torque at the time of engine start is reduced, the load of the motor generator MG is accordingly reduced to suppress overheating etc.

On the other hand, during the non-towing running with relatively smaller vehicle weight, i.e., at the time of normal running, relatively smaller inertia of the vehicle makes the drive force variation due to the engine start torque relatively larger and a shock such as a pull-in feeling becomes larger; however, since the compensation torque from the motor generator MG is made larger in accordance with the start torque, the shock is properly suppressed.

In other words, since the compensation torque from the motor generator MG at the time of engine start is changed depending on the vehicle weight in this example, fuel efficiency can be improved while the shock due to the start torque is properly suppressed, and the load of the motor generator MG is reduced to suppress overheating etc.

During the towing running with larger vehicle weight, since the motor running range is expanded to increase the frequency of running with only the motor generator MG used as a drive force source, fuel efficiency can further be improved. This is a technique that can be realized because the compensation torque of the motor generator MG is reduced at the time of cranking of the engine 12 during the towing running to decrease the load of the motor generator MG.

Although the example of the present invention has been described in detail with reference to the drawings, the example is merely an embodiment and the present invention can be implemented in variously modified and improved forms based on the knowledge of those skilled in the art.

NOMENCLATURE OF ELEMENTS

10: hybrid vehicle 12: engine 34: K0 clutch (connecting/disconnecting device) 58: towing switch 70: electronic control device 76: towing running control means 78: motor running range expanding means 80: engine start control means 82: vehicle weight determining means 84: compensation torque control means MG: motor generator (electric motor) Acc: accelerator operation amount (request drive force)

The invention claimed is:

1. An engine start control device of a hybrid vehicle including an electric motor, and an engine connected to a drive force transmission path via a connecting/disconnecting device connecting/disconnecting power transmission, the engine start control device connecting the connecting/disconnecting device to crank the engine during running with the electric motor and increasing a torque of the electric motor at the time of cranking of the engine, wherein when a vehicle weight is determined, if the vehicle weight is larger, a torque increase amount of the electric motor increased at the time of cranking of the engine is made smaller as compared to when the vehicle weight is smaller.

2. The engine start control device of a hybrid vehicle of claim 1, wherein running only with the electric motor and running using the engine are switched based on a driver's request drive force, and wherein when the vehicle weight is larger, a range of the request drive force for the running only with the electric motor is made larger as compared to when the vehicle weight is smaller.

3. The engine start control device of a hybrid vehicle of claim 1, wherein the case of the larger vehicle weight corresponds to a time of towing running.

\* \* \* \* \*